US012456595B2

(12) United States Patent
Holp et al.

(10) Patent No.: US 12,456,595 B2
(45) Date of Patent: Oct. 28, 2025

(54) CIRCUIT INTERRUPTER WITH TAPERED DRIVE SHAFT SECTION

(71) Applicant: EATON INTELLIGENT POWER LIMITED, Dublin (IE)

(72) Inventors: Tyler Holp, Coraopolis, PA (US); Logan Dwight Weigle, McKees Rocks, PA (US); Steven Z. Chen, Coraopolis, PA (US); Santhosh Kumar Chamarajanagar Govinda Nayaka, Moon Township, PA (US); Robert Michael Slepian, Murrysville, PA (US); Hongbin Wang, Novi, MI (US); Brian J. Schaltenbrand, Pittsburgh, PA (US); Eric D. Smith, Painted Post, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 281 days.

(21) Appl. No.: 18/132,620

(22) Filed: Apr. 10, 2023

(65) Prior Publication Data

US 2024/0339277 A1 Oct. 10, 2024

(51) Int. Cl.

*H01H 50/64* (2006.01)
*H01H 50/02* (2006.01)
*H01H 50/54* (2006.01)

(52) U.S. Cl.

CPC .......... *H01H 50/641* (2013.01); *H01H 50/02* (2013.01); *H01H 50/54* (2013.01)

(58) Field of Classification Search

CPC ...... H01H 50/641; H01H 50/02; H01H 50/54; H01H 3/58; H01H 3/60; H01H 3/222; H01H 3/20

USPC ............... 218/120, 123, 140, 146, 153, 154; 248/562; 335/185

See application file for complete search history.

(56) References Cited

U.S. PATENT DOCUMENTS 4,648,577 A * 3/1987 Weber .................. F16F 15/023 188/380
11,183,348 B1 11/2021 Leccia et al.
2015/0155112 A1* 6/2015 Goldman ............. H01H 50/305 335/185

FOREIGN PATENT DOCUMENTS

DE 41 16 314 A1 11/1992
GB 973 814 A 10/1964

OTHER PUBLICATIONS

Translation of DE4116314 (Original document published on Nov. 19, 1992) (Year: 1992).*

European Patent Office "International Search Report and Written Opinion" for corresponding international (PCT) patent application No. PCT/IB2024/053430, mailed Jul. 5, 2024, 10 pp.

* cited by examiner

*Primary Examiner* — William A Bolton

(74) *Attorney, Agent, or Firm* — Eckert Seamans Cherin and Mellott, LLC

(57) ABSTRACT

A circuit interrupter includes separable contacts, a drive shaft coupled to the separable contacts and structured to move to open and close the separable contacts, a tapered drive shaft section coupled to the drive shaft and having tapered sides, and a friction assembly. The friction assembly includes a friction device structured to interact with the tapered sides of the tapered drive shaft, an armature coupled to the friction device, and a biasing member structured to bias the friction device and armature toward the tapered drive shaft section.

19 Claims, 11 Drawing Sheets

CIRCUIT INTERRUPTER WITH TAPERED DRIVE SHAFT SECTION

FIELD OF THE INVENTION

The disclosed concept relates generally to circuit interrupters, and in particular, damping and latching mechanisms in circuit interrupters.

BACKGROUND OF THE INVENTION

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit interrupters typically include separable electrical contacts, which operate as a switch. When the separable contacts are in contact with one another in a closed state, current is able to flow through any circuits connected to the circuit interrupter. When the separable contacts are not in contact with one another in an open state, current is prevented from flowing through any circuits connected to the circuit interrupter. The separable contacts may be operated either manually by way of an operator handle, remotely by way of an electrical signal, or automatically in response to a detected fault condition. Typically, such circuit interrupters include an actuator designed to rapidly close or open the separable contacts, and a trip mechanism, such as a trip unit, which senses a number of fault conditions to trip the separable contacts open automatically using the actuator. Upon sensing a fault condition, the trip unit trips the actuator to move the separable contacts to their open position.

Some circuit interrupters such as, for example, power circuit breakers, employ vacuum interrupters as the switching devices. The separable electrical contacts usually included in vacuum interrupters are generally disposed on the ends of corresponding electrodes within an insulating housing that forms a vacuum chamber. Typically, one of the contacts is fixed relative to both the housing and to an external electrical conductor, which is electrically interconnected with a power circuit associated with the vacuum interrupter. The other contact is part of a movable contact assembly including an electrode stem of circular cross-section and a contact disposed on one end of the electrode stem and enclosed within a vacuum chamber. A driving mechanism is disposed on the other end, external to the vacuum chamber. When the trip unit detects a fault condition, the trip unit trips the actuator to cause the driving mechanism to open the separable contacts within the vacuum chamber. After the fault condition has resolved, the trip unit signals the actuator to cause the driving mechanism to drive the separable contacts closed within the vacuum chamber.

In medium and high voltage electrical systems in particular, the actuator of the circuit interrupter needs to be capable of driving the separable contacts open quickly in order to mitigate the effects of a fault condition. In previous embodiments, an over-toggle mechanism with springs has been used to provide closed contact force and open contact position latching. An oil-filled shock absorber has also been used to dampen the high-speed operation of opening contacts. However, the over-toggle mechanism and shock absorber are bulky and non-scalable. The size of these components can increase quickly as the rating of the circuit interrupter is increased. Additionally, the over-toggle mechanism can have reliability issues and risk bouncing back closed.

There is thus room for improvement in circuit interrupters.

SUMMARY OF THE INVENTION

According to an aspect of the disclosed concept, a circuit interrupter comprises: separable contacts; a drive shaft coupled to the separable contacts and structured to move to open and close the separable contacts; a tapered drive shaft section coupled to the drive shaft and having tapered sides; and a friction assembly including: a friction device structured to interact with the tapered sides of the tapered drive shaft; an armature coupled to the friction device; and a biasing member structured to bias the friction device and armature toward the tapered drive shaft section.

According to an aspect of the disclosed concept, a circuit interrupter comprises: separable contacts; a drive shaft coupled to the separable contacts and structured to move to open and close the separable contacts; a tapered drive shaft section coupled to the drive shaft and having tapered sides; and a latch arm assembly including: a latch arm structured to rotate about a pivot point and having an upper end extending over an upper end of the tapered drive shaft section; and a spring-loaded latch structured to extend to prevent the latch from rotating beyond a predetermined point in one direction.

According to an aspect of the disclosed concept, a circuit interrupter comprises: separable contacts; a drive shaft coupled to the separable contacts and structured to move to open and close the separable contacts; a tapered drive shaft section coupled to the drive shaft and having a tapered side and a grooved side; and a ratchet assembly including: a gear structured to interact with the grooved side of the tapered drive shaft section to allow movement in a first direction and prevent movement in a second opposite direction; and a spring-loaded latch structured to interact with the gear to allow the gear to rotate in a first direction and prevent the gear from rotating in a second opposite direction.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1A:
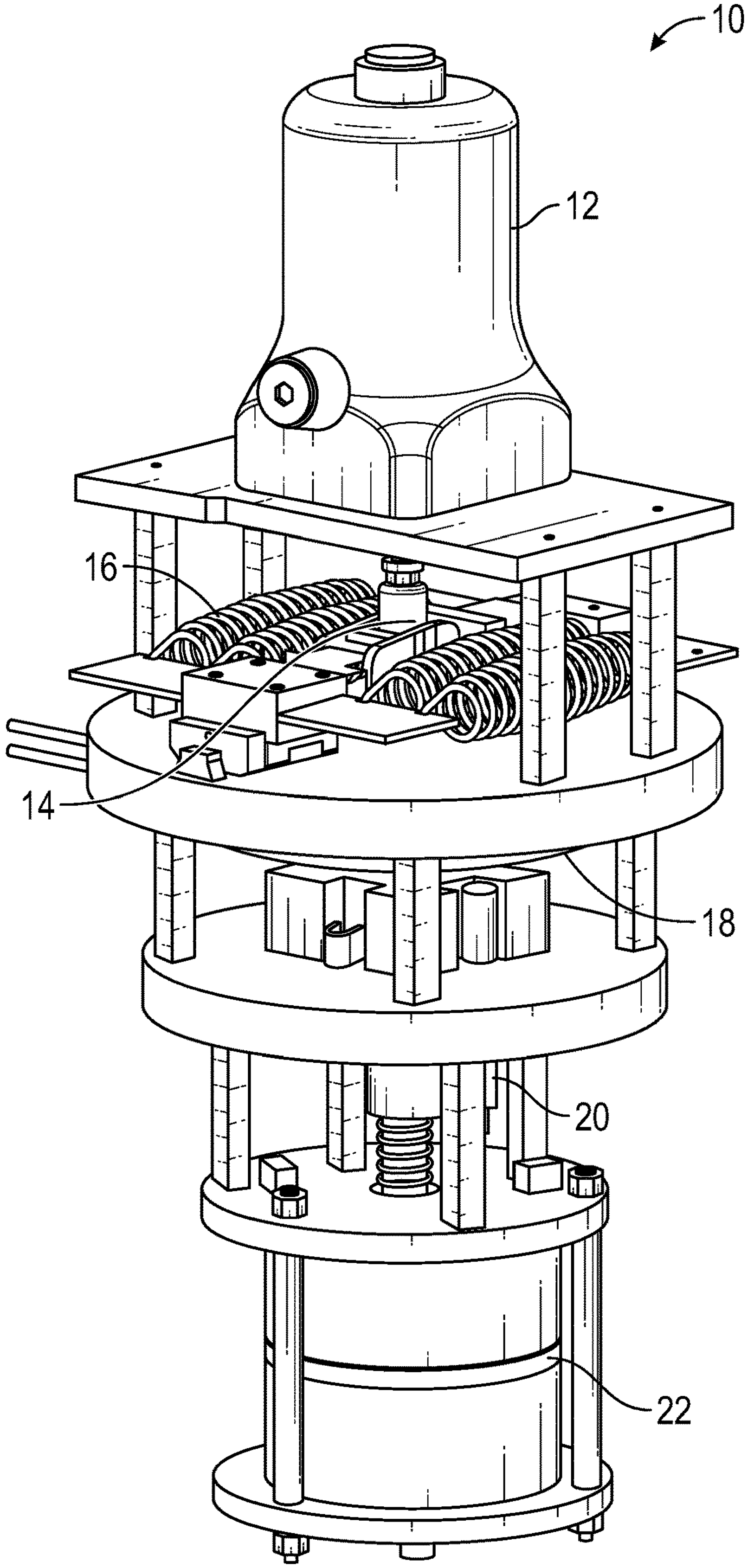
FIG. 1A is an angled view of a circuit interrupter.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As used herein, the singular form of "a", "an", and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

Figure 1B:
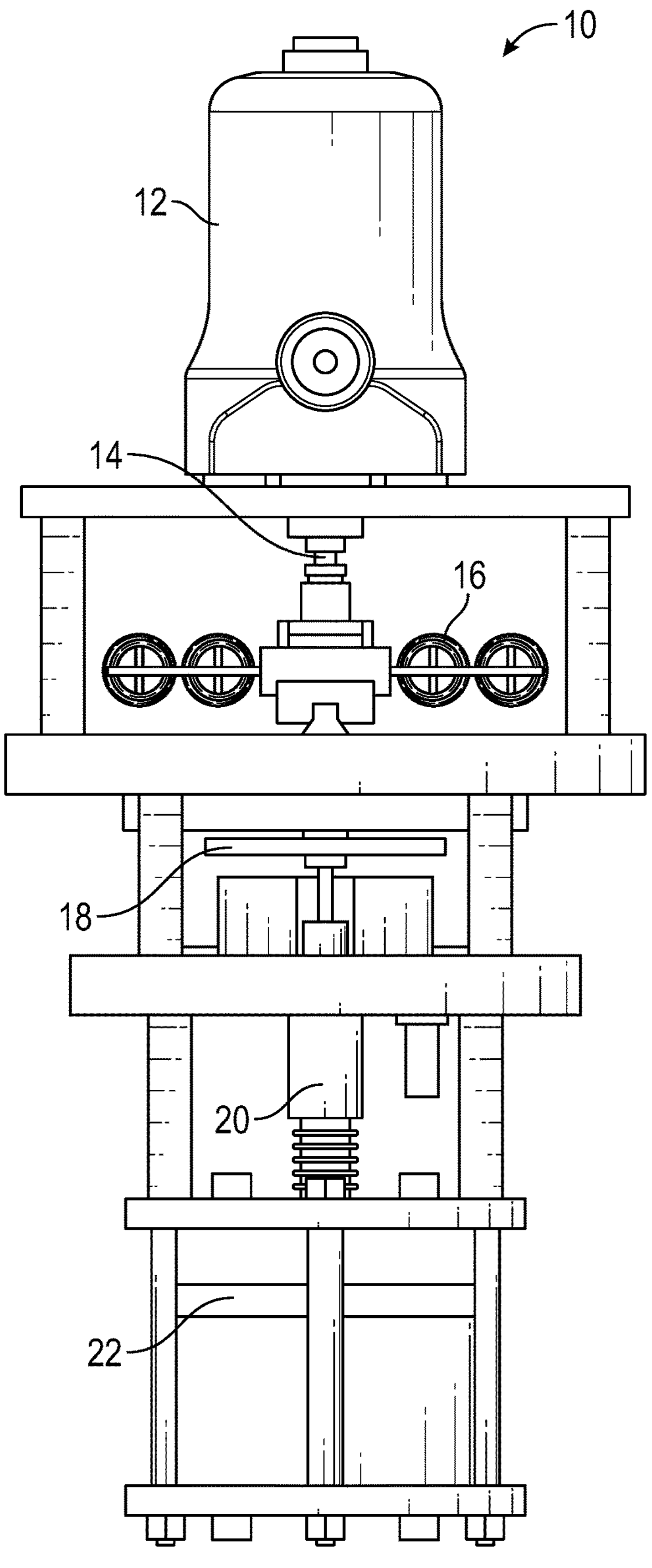
FIG. 1B is an elevation view of the circuit interrupter of FIG. 1A.

FIGS. 1A and 1B are views of an existing circuit interrupter 10. The circuit interrupter 10 includes a vacuum housing 12, a drive link 14, an over-toggle mechanism 16, a Thomson coil actuator 18, a shock absorber 20, and a secondary solenoid actuator 22. Separable contacts are housed in the vacuum housing 12. The separable contacts are opened and closed via actuation by the Thomson coil actuator 18 and the secondary solenoid actuator 22 moving the drive shaft coupled to one of the contacts. For example, the drive shaft is moved downwards to separate the contacts and upward to push the contacts together. The shock absorber 20 may be an oil-filled shock absorber coupled to the drive shaft. The shock absorber 20 is operable to dampen the movement of the drive shaft as fast and abrupt movement of the drive shaft can damage the circuit interrupter 10 over time. The over-toggle mechanism 16 includes a number of springs and is operable to provide closed contact force and an open contact position latch. The over-toggle mechanism 16 and the shock absorber 20 are bulky components that are inefficient and challenging to scale.

Figure 2A:
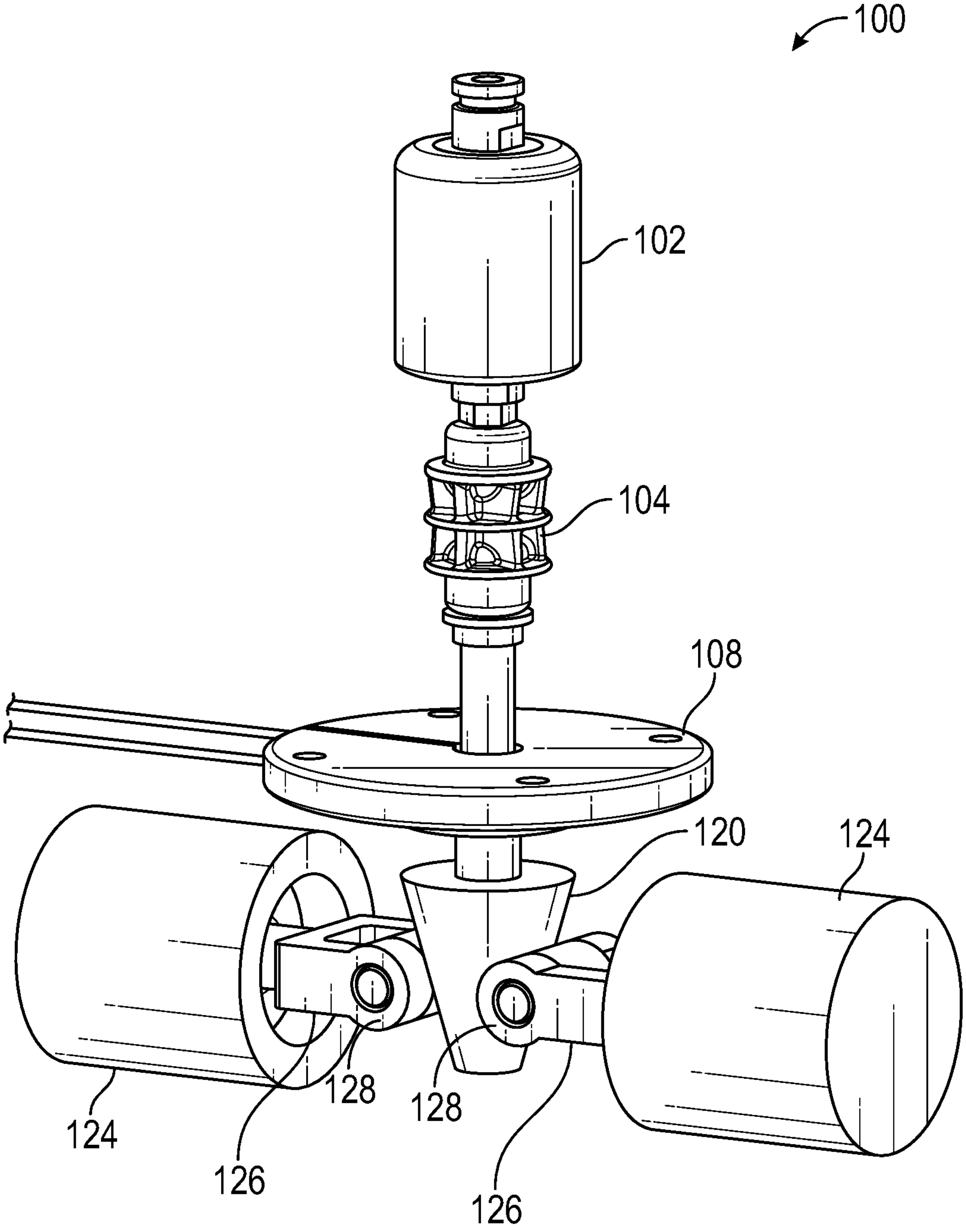
FIG. 2A is an angled view of a circuit interrupter including a tapered drive shaft section in accordance with an example embodiment of the disclosed concept.
Figure 2B:
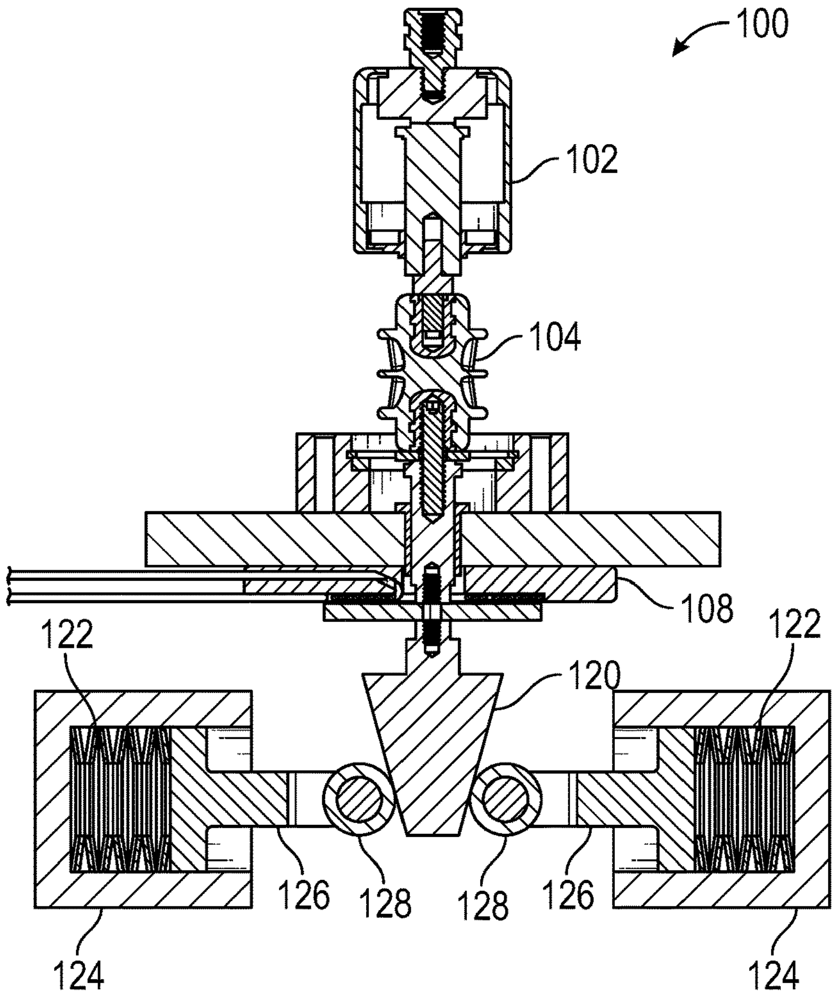
FIG. 2B is an elevation view of the circuit interrupter of FIG. 2A with separable contact in a closed position.
Figure 2C:
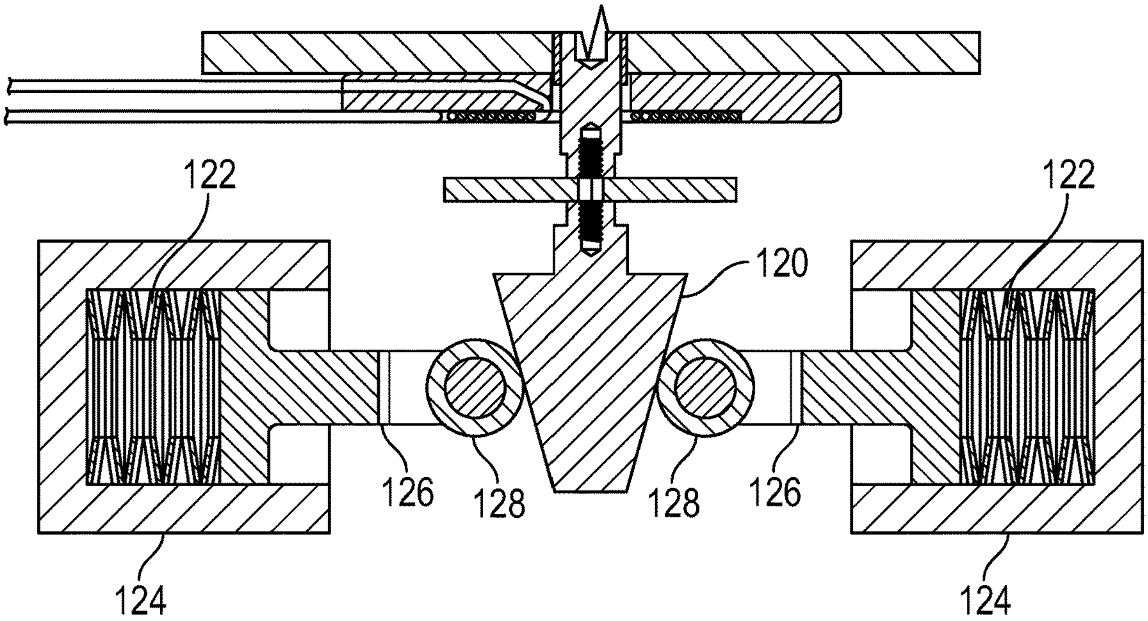
FIG. 2C is a detail view of the tapered drive shaft section of the circuit interrupter of FIG. 2A with separable contacts in an open position.

FIGS. 2A-C are views of a circuit interrupter 100 in accordance with an example embodiment of the disclosed concept. The circuit interrupter 100 includes a vacuum housing 102 in which separable contacts are located. A moving contact of the separable contacts is coupled to a drive shaft via a drive link 104. The circuit interrupter 100 further includes a Thomson coil actuator 108 that actuates to move the drive shaft to move the separable contacts together or apart. The circuit interrupter 100 also includes a tapered drive shaft section 120 coupled to a lower part of the drive shaft. The tapered drive shaft section 120 has tapered sides which are narrower at a lower end of the tapered drive shaft section 120 and wider at an upper end of the tapered drive shaft section 120. In an example embodiment, the tapered drive shaft section 120 has a frustoconical shape whose lower end is narrower that its upper end. The circuit interrupter 100 additionally includes a washer housing 124 which houses a number of washers 122. In an example embodiment of the disclosed concept, the washers are Belleville washers that compress under pressure. An armature 126 has a first end disposed in the washer housing 124 adjacent to the washers 122. The armature 126 extends from the washer housing 124 to a second end outside the washer housing 124. A roller 128 is coupled to the second end of the armature 126. The washer housing 124, washers 122, armature 126, and roller device 128 are disposed such that the roller device 128 contact a side of the tapered drive shaft section 120. Together, the washer housing 124, washers 122, armature 126, and roller device 128 are referred to herein as a washer friction assembly. The circuit interrupter 100 includes a pair of washer friction assemblies disposed on opposite sides of the tapered drive shaft section 120.

The washer friction assemblies are structured to dampen a downward motion of the drive shaft via frictional force. In more detail, as shown in FIG. 2B, the separable contacts are pressed together and the drive shaft is in its upper most position. In this position, the roller devices 128 of the washer friction assemblies contact a lower portion of the tapered drive shaft section 120. As the drive shaft moves downward to separate the separable contacts, the tapered drive shaft section 120 moves downward with respect to the washer friction assemblies, such that the roller devices 128 press against wider and wider portions of the tapered drive shaft section 120 as the drive shaft moves downward. For example, as shown in FIG. 2C, due to downward movement of the drive shaft, the roller devices 128 contact a wider section of the tapered drive shaft section 120 compared to FIG. 2B where the drive shaft is in its upper most position. As the roller device 128 move up the tapered drive shaft section 120 to where it is wider, the friction of the roller devices 128 against the tapered drive shaft section 120 increases due to increasing compression of the washers 122. This increasing frictional force dampens the downward movement of the drive shaft. The washer friction assemblies provide a damping function that is compact and scalable compared to an oil filled shock absorber.

It will be appreciated that washers and roller devices are merely an example embodiment of the disclosed concept. The roller devices may be replaced with other types of friction devices structured to interact with tapered sides of the tapered drive shaft section 120 without departing from the scope of the disclosed concept. For example and without limitation, bushings or brake pads may be employed in place of the roller devices without departing from the scope of the disclosed concept. Additionally, other biasing devices, such as for example and without limitation, springs may be used in place of the washers to bias the armature and roller devices toward the tapered sides of the tapered drive shaft section 120.

Figure 3A:
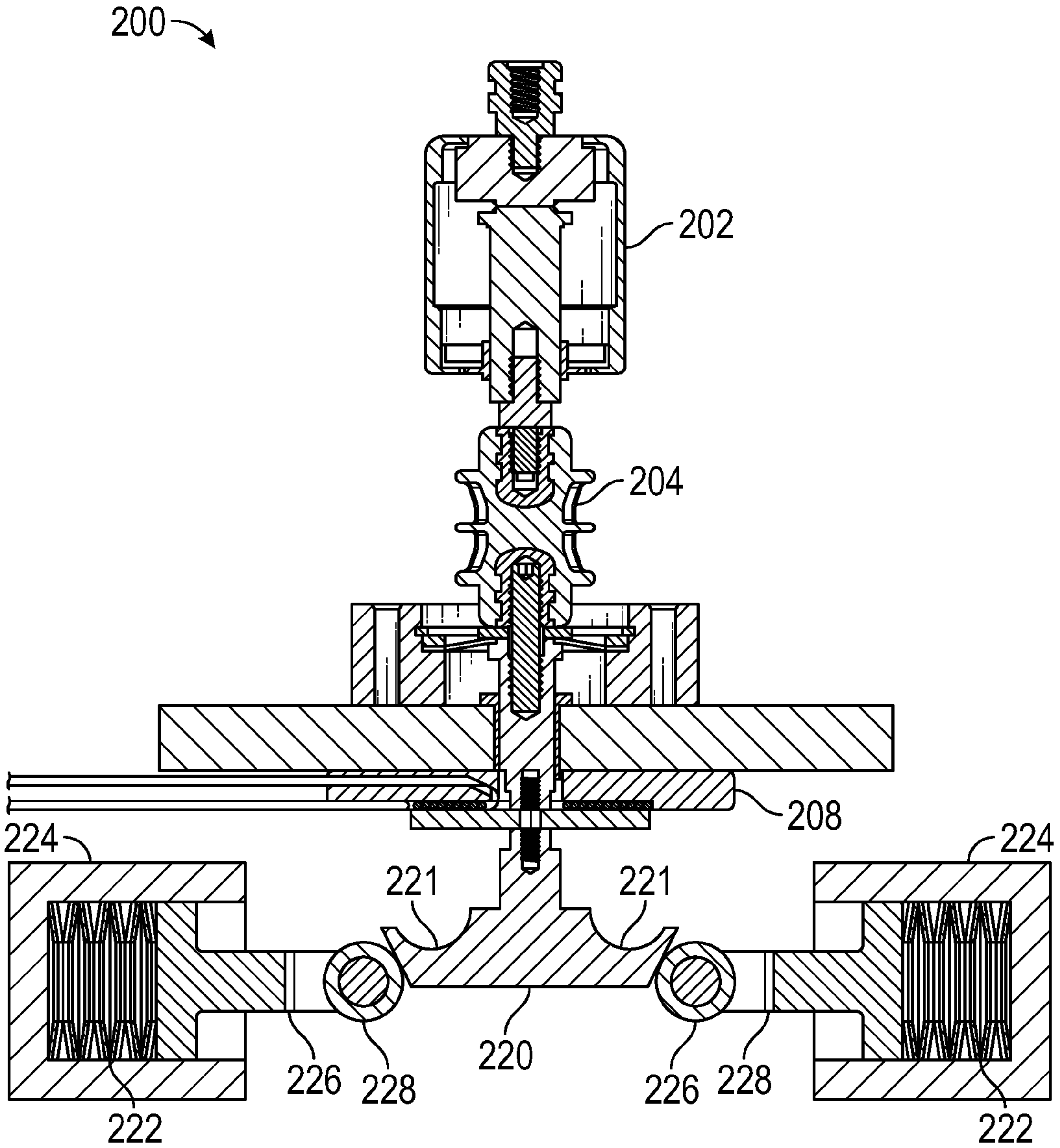
FIG. 3A is an elevation view of a circuit interrupter including a tapered drive shaft section that provides a latching function in accordance with an example embodiment of the disclosed concept.
Figure 3B:
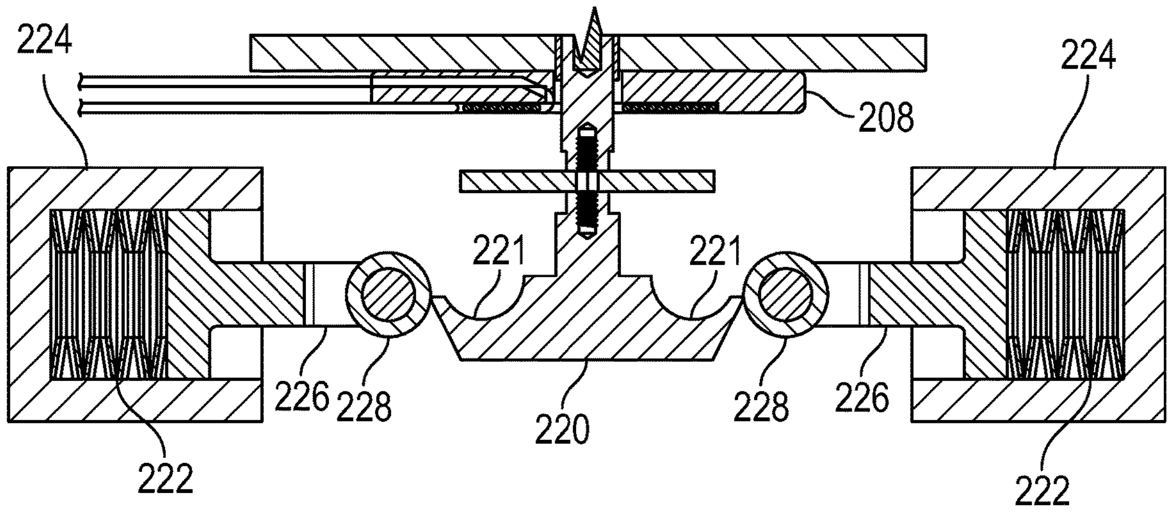
FIG. 3B is a detail view of the tapered drive shaft section of the circuit interrupter of FIG. 3A with separable contacts in the process of opening.
Figure 3C:
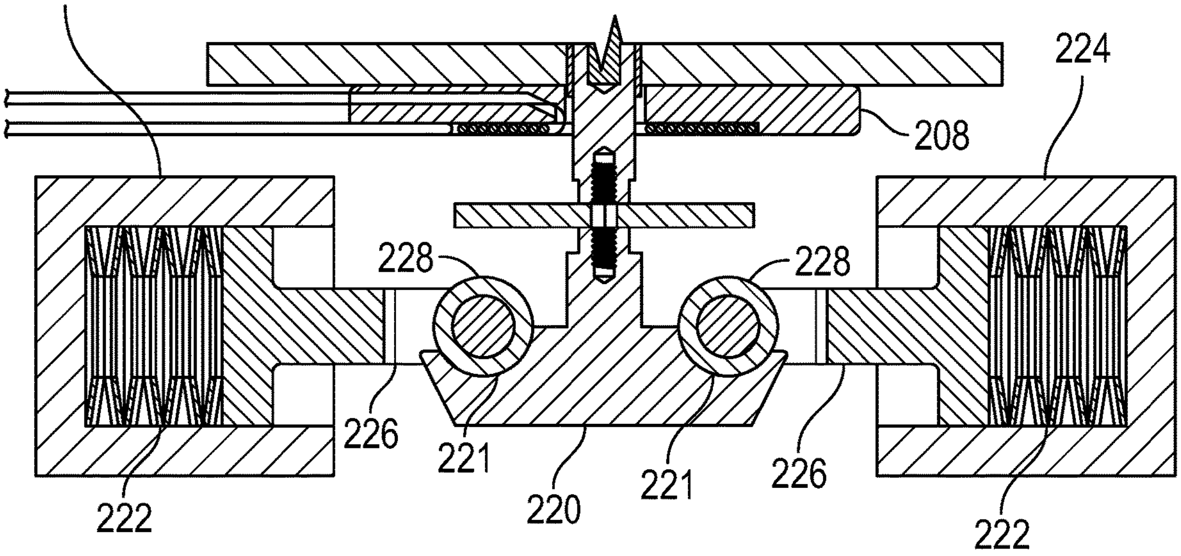
FIG. 3C is a detail view of the tapered drive shaft section of the circuit interrupter of FIG. 3A with separable contacts latched in the open position.

FIGS. 3A-3C are views of another example embodiment of a circuit interrupter 200. The circuit interrupter 200 includes a vacuum housing 202, separable contacts, drive shaft, drive link 204, Thomson coil 208, and a pair of washer friction assemblies (including washers 222, a washer housing 224, armature 226, and roller devices 228 similar to the vacuum housing 102, separable contacts, drive shaft, drive link 104, Thomson coil 108, and a pair of washer friction assemblies (including washers 122, a washer housing 124, armature 126, and roller devices 128) similar to the circuit interrupter 100 of FIGS. 2A-C. For economy of disclosure, a repeated description of these components is omitted.

The circuit interrupter 200 includes a tapered drive shaft section 220 that has a frustoconical shape. However, unlike the tapered drive shaft section 120 shown in FIGS. 2A-C, the tapered drive shaft section 220 further includes a pair of arcuate cutouts 221 on its upper side. The arcuate cutouts 221 correspond in shape to the bottom side of the roller devices 228. The arcuate cutouts 221 are operable to latch the circuit interrupter 200 in the open position. In more detail, the washer friction devices and tapered drive shaft 220 provide a damping function as the drive shaft moves downward and the roller devices 220 contact increasingly wider section of the tapered drive shaft section 220. For example, in FIG. 3A, the drive shaft is in its uppermost position and the roller devices 228 contact a narrower section of the tapered drive shaft section 220. In FIG. 3B, the drive shaft has moved downward and the roller devices 228 contact a wider section of the tapered drive shaft section 220, thus increasing the frictional force against the tapered drive shaft section 220 and damping the downward movement of the drive shaft. As the drive shaft continues to move downward, the roller devices 228 reach the upper edges of the tapered drive shaft section 220. As the roller devices 228 pass the upper edge of the tapered drive shaft section 220, the pressure of washers 222 pushes the roller devices 228 toward the center of the tapered drive shaft section 220. The roller devices 228 become seated in the arcuate cutouts 221, as shown in FIG. 3C. While the roller devices 228 are seated in the arcuate cutouts 221, the roller devices 228 prevent further upward movement of the drive shaft. That is, the circuit interrupter 200 becomes latched open and is prevented from closing the separable contacts. Thus, the washer friction assemblies and the tapered drive shaft section 220 provide a damping function that is compact and scalable compared to an oil filled shock absorber and a latching function that is compact, scalable, and reliable compared to a spring over-toggle mechanism.

Figure 4A:
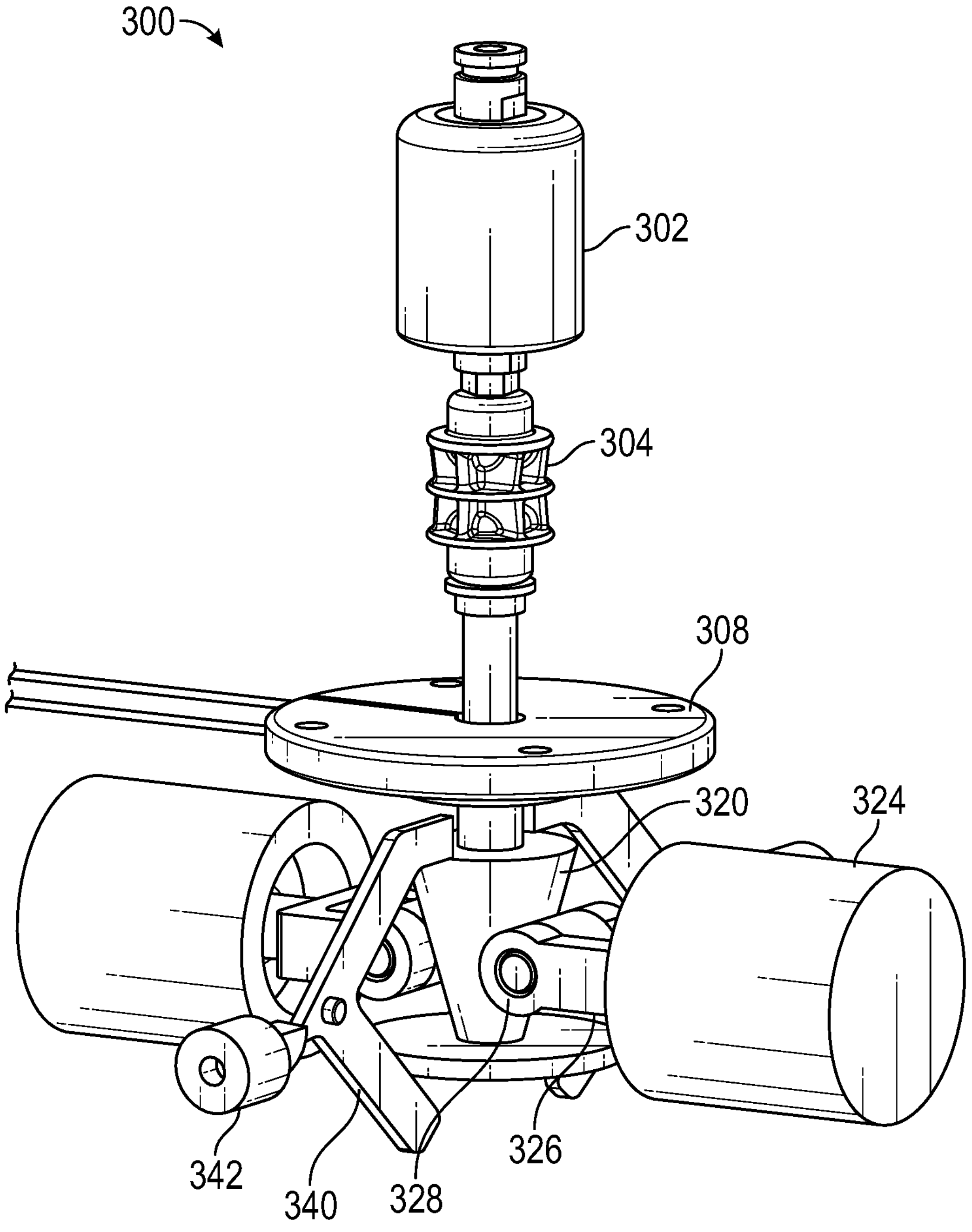
FIG. 4A is an angled view of a circuit interrupter with a tapered drive shaft section and a latch arm in accordance with an example embodiment of the disclosed concept.
Figure 4B:
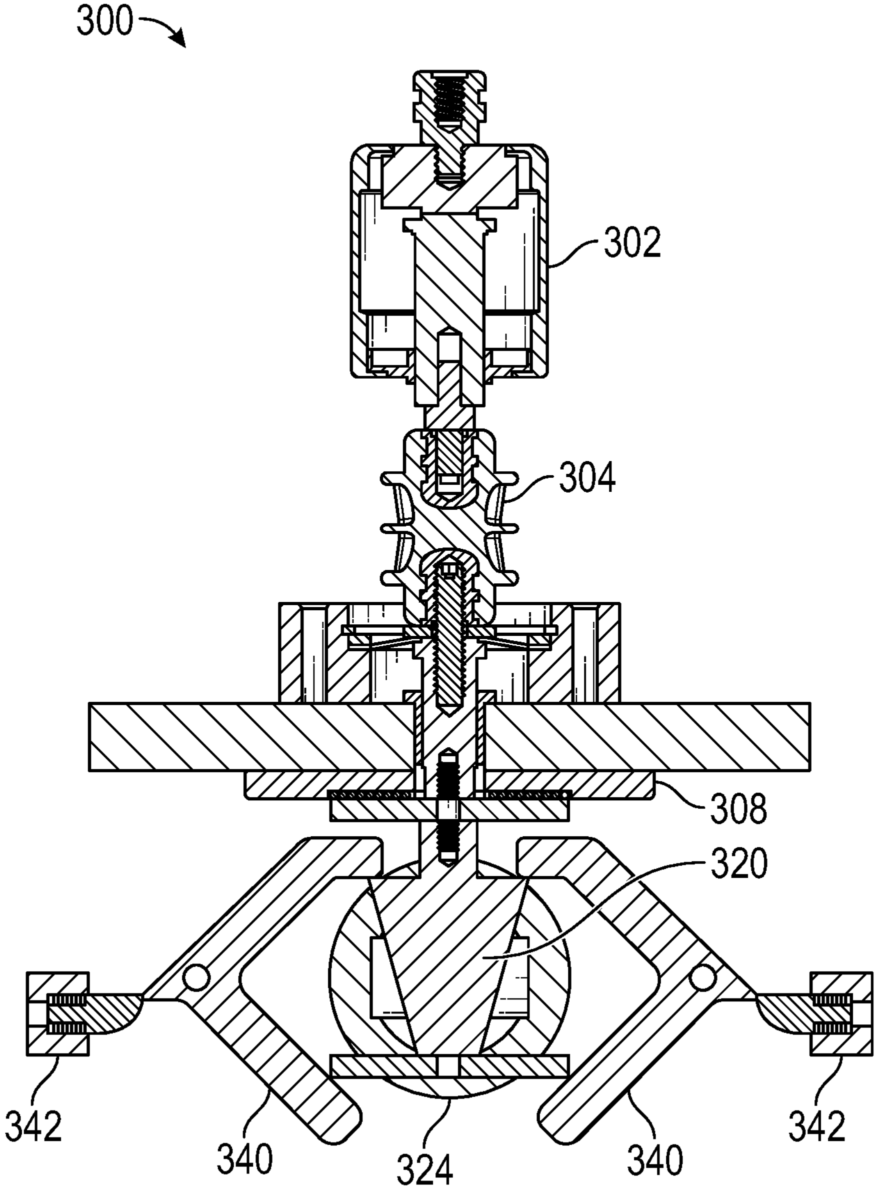
FIG. 4B is an elevation view of the circuit interrupter of FIG. 4A with separable contacts in a closed position.
Figure 4C:
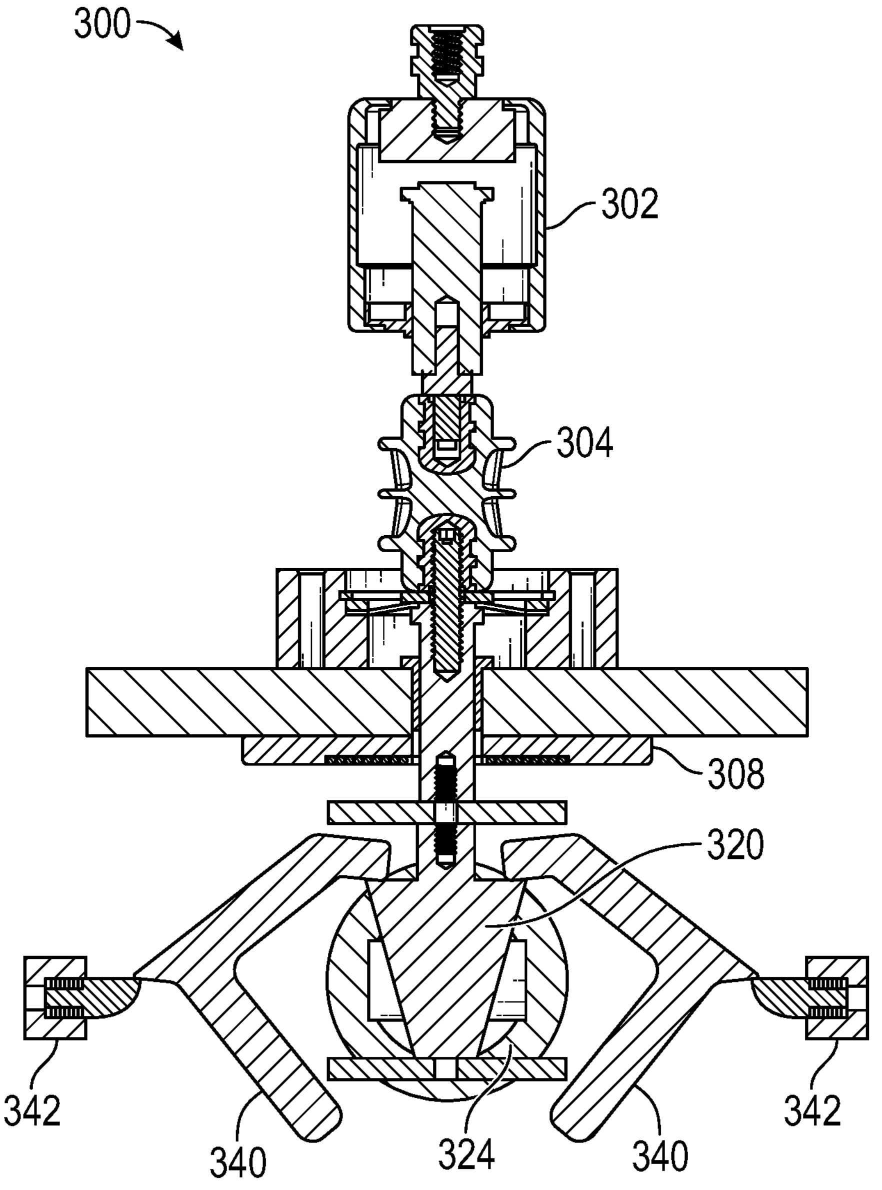
FIG. 4C is an elevation view of the circuit interrupter of FIG. 4A with separable contact latched in an open position.

FIGS. 4A-4C are views of another example embodiment of a circuit interrupter 300. The circuit interrupter 300 includes a vacuum housing 302, separable contacts, drive shaft, drive link 304, Thomson coil 308, tapered drive shaft 320 and a pair of washer friction assemblies (including washers (not shown), a washer housing 324, armature 326, and roller devices 328 similar to the vacuum housing 102, separable contacts, drive shaft, drive link 104, Thomson coil 108, tapered drive shaft section 120 and a pair of washer friction assemblies (including washers 122, a washer housing 124, armature 126, and roller devices 128) similar to the circuit interrupter 100 of FIGS. 2A-C. For economy of disclosure, a repeated description of these components is omitted.

The circuit interrupter 300 further includes a pair of latch assemblies, each including a latch arm 340 and a spring-loaded latch 342. The pair of latch assemblies are disposed on opposite sides of the tapered drive shaft section 320 in a plane perpendicular to the plane in which the washer friction assemblies. The latch arm 340 is an angled member that is structured to rotate about a pivot point proximate the spring-loaded latch 342. An upper portion of the latch arm 340 extends over the top side of the tapered drive shaft section 320. The latch arm 340 includes an extension that extends from the pivot point toward the spring-loaded latch 342.

The spring-loaded latch 342 includes a spring and a latch member. The spring is structured to bias the latch member toward the latch arm 340. The latch member includes a flat upper side and a curved lower side. The latch member is structured to interact with the extension of the latch arm 340 to cause the circuit interrupter 300 to latch open. In more detail, FIG. 4B shows the circuit interrupter 300 in a closed position where the separable contacts are closed and the drive shaft is in its uppermost position. In this position, the tip of the extension of the latch arm 340 is even with or below the upper edge of the latch member. FIG. 4C shows the circuit interrupter 300 in the open position in which the drive shaft has moved downward to open the separable contacts. As the drive shaft moves downward, the upper portion of the latch arm 340 rotates toward the drive shaft. This rotation causes the extension of the latch arm 340 to move upward above the top edge of the latch member. When the tip of the extension of the latch arm 340 moves above the top edge of the latch member, the spring presses the latch member toward the extension of the latch arm 340 and causes the latch member to slide below the extension of the latch arm 340. In this position, shown in FIG. 4C, the latch arm 340 prevents the drive shaft from moving upward and closing the separable contacts. In more detail, in this position, the upper end of the latch arm 340 abuts against the upper end of the tapered drive shaft section 320 and the bottom side of the extension of the latch arm 340 abuts against the upper side of the latch member. Thus, the upper side of the latch arm 340 cannot move upward as the extension of the latch arm 340 abutting against the latch member prevents rotation in that direction. As such, the drive shaft cannot move upward to close the separable contacts and the circuit interrupter 300 is latched open. The circuit interrupter 300 provides a damping function via the washer friction assemblies and the tapered drive shaft section 320 that is compact and scalable compared to an oil filled shock absorber and the latch arm 340 and spring-loaded latches 342 provide a latching function that is compact, scalable, and reliable compared to a spring over-toggle mechanism.

Figure 5A:
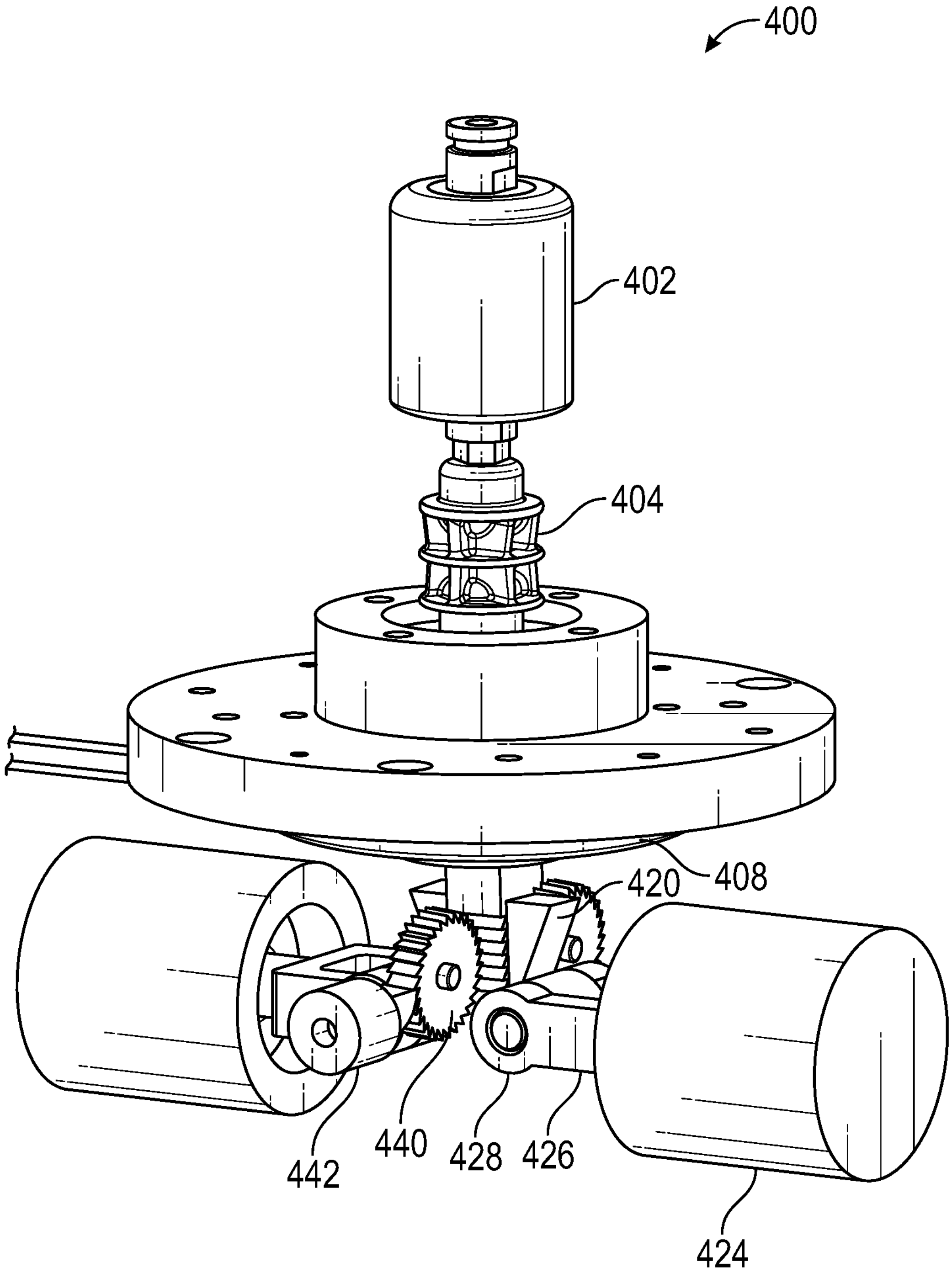
FIG. 5A is an angled view of a circuit interrupter with a tapered drive shaft section and a ratchet latching mechanism in accordance with an example embodiment of the disclosed concept.
Figure 5B:
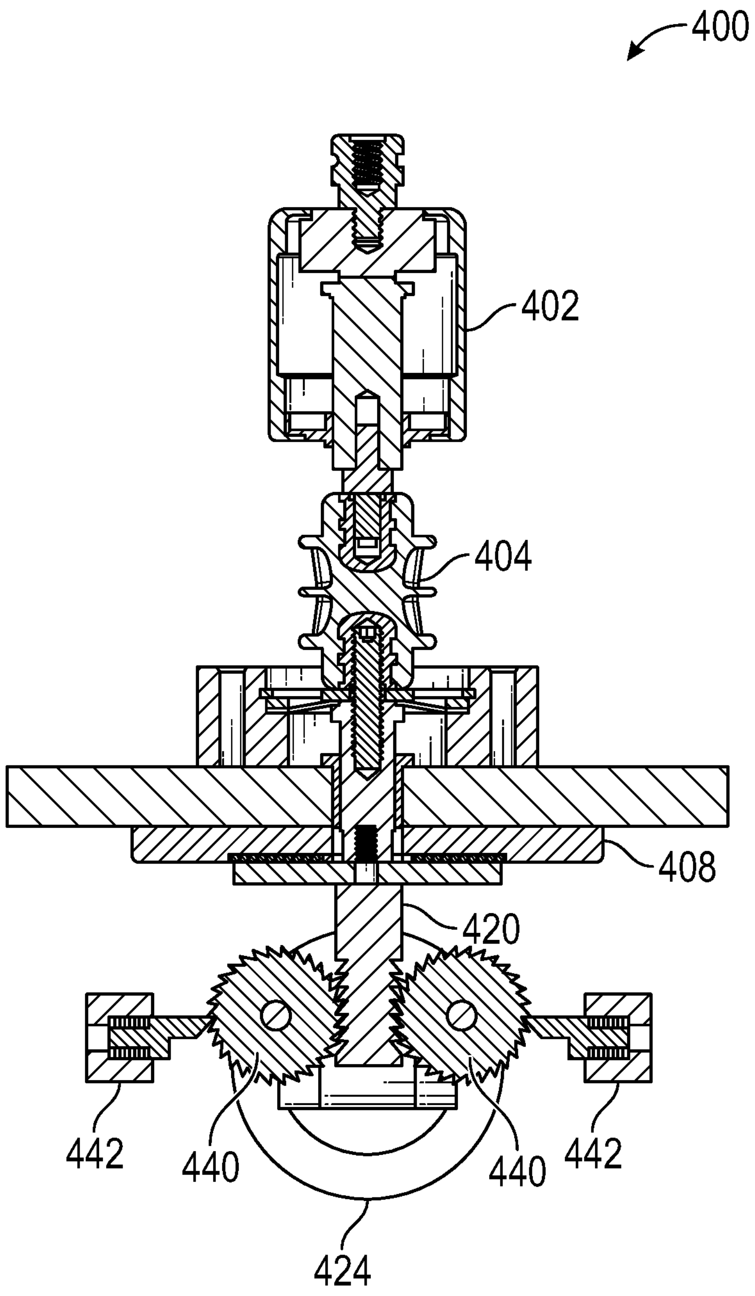
FIG. 5B is an elevation view of the circuit interrupter of FIG. 5A.

FIGS. 5A-5B are views of another example embodiment of a circuit interrupter 400. The circuit interrupter 400 includes a vacuum housing 402, separable contacts, drive shaft, drive link 404, Thomson coil 408, and a pair of washer friction assemblies (including washers (not shown), a washer housing 424, armature 426, and roller devices 428 similar to the vacuum housing 102, separable contacts, drive shaft, drive link 104, Thomson coil 108, and a pair of washer friction assemblies (including washers 122, a washer housing 124, armature 126, and roller devices 128) similar to the circuit interrupter 100 of FIGS. 2A-C. For economy of disclosure, a repeated description of these components is omitted.

The circuit interrupter 400 includes a tapered drive shaft section 420 that includes two tapered sides opposite of each other and two grooved sides opposite of each other. The tapered sides of the tapered drive shaft section 420 correspond to the washer friction assemblies, and are operable in conjunction with the washer friction assemblies to dampen downward motion of the drive shaft, similar to the washer friction assemblies and tapered drive shaft 120 of the circuit interrupter 100 of FIGS. 1A-1C.

The circuit interrupter 400 further includes a pair of ratchet latch assemblies that correspond to the grooved sides of the tapered drive shaft section 420. The ratchet latch assemblies each include a spring-loaded latch 442 and a gear 440. The spring-loaded latch 442, gear 440, and grooved sides of the tapered drive shaft section 420 are operable as a ratchet mechanism. That is, the spring-loaded latch 442 and gear 440 are structured such that the spring-loaded latch 442 allows the gear 440 to rotate in one direction, but prevents the gear 440 from rotating in the opposite direction, like a ratchet. The gear 440 and grooved sides of the tapered drive shaft section 420 operate in a similar manner in that the teeth of the gear 440 and the teeth of the grooved sides of the tapered drive shaft section 420 are structured such that the grooved sides of the tapered drive shaft section 420 are able to move upward, but are prevented from moving downward due to the interaction between the teeth of the gear 440 and the teeth of the grooved sides of the tapered drive shaft section 420. It will be appreciated that the orientation of the teeth may be reversed to prevent movement in the opposite direction. That is, the ratchet latching mechanism may be used to latch open or latch closed the circuit interrupter 400 without departing from the scope of the disclosed concept. The circuit interrupter 400 provides a damping function via the washer friction assemblies and the tapered drive shaft section 420 that is compact and scalable compared to an oil filled shock absorber and the gears 440 and spring-loaded latches 442 provide a latching function that is compact, scalable, and reliable compared to a spring over-toggle mechanism.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A circuit interrupter comprising:
separable contacts;
a drive shaft coupled to the separable contacts and structured to move to open and close the separable contacts;
a tapered drive shaft section coupled to the drive shaft and having tapered sides; and
a friction assembly including:
a friction device structured to interact with the tapered sides of the tapered drive shaft;
an armature coupled to the friction device; and
a biasing member structured to bias the friction device and armature toward the tapered drive shaft section,
wherein a top side of the tapered drive shaft section includes an arcuate cutout corresponding in shape to the friction device, a wherein downward movement of the tapered drive shaft section beyond predetermined point causes the friction device to extend into and be seated in the arcuate cutout.

2. The circuit interrupter of claim 1, wherein the friction device is a roller device.

3. The circuit interrupter of claim 1, wherein the biasing member is a plurality of washers.

4. The circuit interrupter of claim 3, wherein the plurality of washers are a plurality of Belleville washers.

5. The circuit interrupter of claim 1, wherein the tapered drive shaft section has a frustoconical shape.

6. The circuit interrupter of claim 1, wherein when the friction device is seated in the arcuate cutout, the separable contacts are in an open position and interaction between the friction device and arcuate cutout prevent the separable contacts from moving to a closed position.

7. The circuit interrupter of claim 1, wherein the friction assembly including a first friction assembly and a second friction assembly, and wherein the first friction assembly and the second friction assembly are disposed on opposite sides of the tapered drive shaft section.

8. The circuit interrupter of claim 1, further comprising:
a housing structured to house the biasing device and a portion of the armature, wherein the armature extends from an interior of the housing to an exterior of the housing.

9. A circuit interrupter comprising:
separable contacts;
a drive shaft coupled to the separable contacts and structured to move to open and close the separable contacts;
a tapered drive shaft section coupled to the drive shaft and having tapered sides; and
a latch arm assembly including:
a latch arm structured to rotate about a pivot point and having an upper end extending over an upper end of the tapered drive shaft section; and
a spring-loaded latch structured to extend to prevent the latch from rotating beyond a predetermined point in one direction.

10. The circuit interrupter of claim 9, further comprising:
a friction assembly including:
a friction device structured to interact with the tapered sides of the tapered drive shaft;
an armature coupled to the friction device; and
a biasing member structured to bias the friction device and armature toward the tapered drive shaft section.

11. The circuit interrupter of claim 10, wherein the friction device is a roller device.

12. The circuit interrupter of claim 10, wherein the biasing member is a plurality of washers.

13. The circuit interrupter of claim 9, wherein the latch arm includes an extension disposed proximate the pivot point, and wherein the extension is structured to interact with the spring-loaded latch.

14. The circuit interrupter of claim 13, wherein the spring-loaded latch includes a flat upper side and a curved lower side.

15. A circuit interrupter comprising:
separable contacts;
a drive shaft coupled to the separable contacts and structured to move to open and close the separable contacts;
a tapered drive shaft section coupled to the drive shaft and having a tapered side and a grooved side; and
a ratchet assembly including:
a gear structured to interact with the grooved side of the tapered drive shaft section to allow movement of the tapered drive shaft in a first direction and prevent movement in a second opposite direction; and
a spring-loaded latch structured to interact with the gear to allow the gear to rotate in a first direction and prevent the gear from rotating in a second opposite direction.

16. The circuit interrupter of claim 15, further comprising:
a friction assembly including:
a friction device structured to interact with the tapered side of the tapered drive shaft;
an armature coupled to the friction device; and
a biasing member structured to bias the friction device and armature toward the tapered drive shaft section.

17. The circuit interrupter of claim 16, wherein the friction device is a roller device.

18. The circuit interrupter of claim 16, wherein the biasing member is a plurality of washers.

19. The circuit interrupter of claim 18, wherein the plurality of washers are a plurality of Belleville washers.

* * * * *